United States Patent
Kerchner

(10) Patent No.: US 8,109,475 B2
(45) Date of Patent: Feb. 7, 2012

(54) PIG TAIL SPRING EXHAUST HANGER

(75) Inventor: Douglas M. Kerchner, Goodrich, MI (US)

(73) Assignee: GM Global Technology Operations LLC, Detroit, MI (US)

(*) Notice: Subject to any disclaimer, the term of this patent is extended or adjusted under 35 U.S.C. 154(b) by 42 days.

(21) Appl. No.: 12/638,427

(22) Filed: Dec. 15, 2009

(65) Prior Publication Data

US 2011/0139943 A1    Jun. 16, 2011

(51) Int. Cl.
    *E21F 17/02*      (2006.01)
    *F16L 3/00*      (2006.01)

(52) U.S. Cl. .............. 248/60; 248/610; 248/302

(58) Field of Classification Search .......... 248/60, 248/610, 611, 58, 62, 302, 303
See application file for complete search history.

(56) References Cited

U.S. PATENT DOCUMENTS

| | | | | |
|---|---|---|---|---|
| 2,160,808 A * | 6/1939 | Bradley | .................. | 180/311 |
| 2,619,888 A * | 12/1952 | Young et al. | .................. | 280/421 |
| 2,912,198 A * | 11/1959 | Feil, Jr. | .................. | 248/589 |
| 2,970,849 A | 2/1961 | Betts | | |
| 3,204,901 A * | 9/1965 | Dunu | .................. | 248/74.3 |
| 3,313,503 A * | 4/1967 | Mayr | .................. | 248/60 |
| 3,883,934 A * | 5/1975 | Rochfort | .................. | 248/65 |
| 4,019,599 A * | 4/1977 | Strunk | .................. | 180/296 |
| 4,116,411 A * | 9/1978 | Masuda | .................. | 248/60 |
| 4,676,332 A * | 6/1987 | Saito | .................. | 180/89.2 |
| 4,932,703 A | 6/1990 | Chamberlin et al. | | |
| 5,398,907 A * | 3/1995 | Kelchner | .................. | 248/634 |
| 5,673,877 A | 10/1997 | Karner et al. | | |
| 6,402,119 B1 * | 6/2002 | Miska | .................. | 248/613 |
| 6,572,070 B2 * | 6/2003 | Arciero et al. | .................. | 248/610 |

* cited by examiner

*Primary Examiner* — Anita M King

(57) ABSTRACT

A pig tail spring exhaust hanger includes a pig tail coil having at one end an upper arm and at the other end a lower arm. The upper arm is mounted to the vehicle underbody, and the lower arm is connected to the exhaust system, wherein the orientation of the upper and lower arms is substantially vertical and the orientation of the central axis of the pig tail coil is substantially horizontal. This arrangement provides a moment at each of the upper and lower arms which act to suspended weight of the exhaust system radially with respect to the pig tail coil.

9 Claims, 2 Drawing Sheets

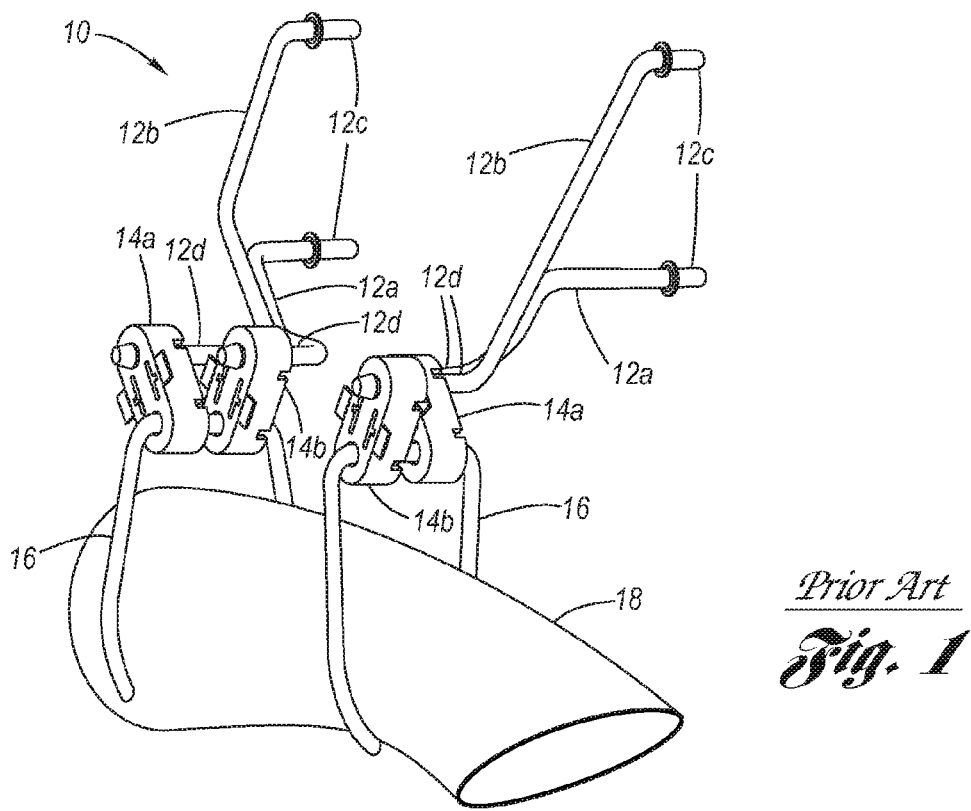
*Prior Art*
*Fig. 1*
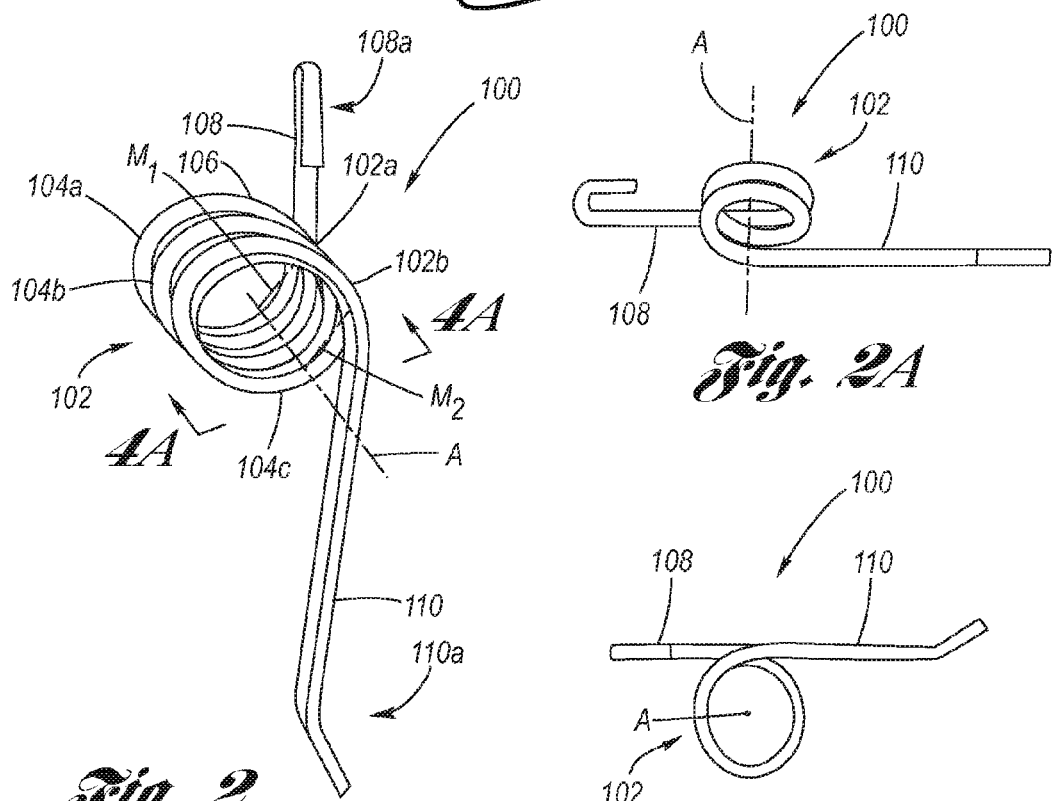
*Fig. 2*
*Fig. 2A*
*Fig. 2B*

PIG TAIL SPRING EXHAUST HANGER

TECHNICAL FIELD

The present invention relates to hangers utilized for hanging exhaust components of a motor vehicle with respect to the underbody thereof.

BACKGROUND OF THE INVENTION

Motor vehicles utilizing internal combustion engines pipe the exhaust under the vehicle, wherein the exhaust system is flexibly suspended from the vehicle underbody by one or more exhaust hanger assemblies. A typical exhaust hanger assembly uses flexible elements having low stiffness to support the exhaust pipe in combination with stiffer elements having higher resonant frequencies for attaching the exhaust hanger assembly to the underbody of the vehicle. Together, these elements serve to impede the transmission of noise and vibration from the exhaust system to the floor of the passenger compartment. In addition, the exhaust hanger assembly also prevents the transmission of heat from the exhaust system to the vehicle underbody.

As described in U.S. Pat. No. 5,673,877, a typical prior art exhaust hanger assembly for flexibly suspending an exhaust pipe from the vehicle underbody includes a combination of one or more bent rod members, flexible elements, and clamp or strap members, all of which extend downwardly from the vehicle underbody. The stiffer component for attachment to the vehicle underbody is typically fastened, such as by bolts, onto the outside of a supportive vehicle underbody component, such as the vehicle frame. For example, one common arrangement includes a first bent rod member having a bent end portion bolted to the outside of the frame of the vehicle, a second bent rod member having a bent end portion mounted to the exhaust pipe, and a flexible element having two holes, each receiving one of the two bent end portions of the first and second rod members. These typical prior art exhaust hangers are designed to flexibly suspend the exhaust pipe and to impede the transmission of unpleasant low frequency vibrations to the vehicle compartment by the stiffer vehicle attachment component.

By way of exemplification, a prior art exhaust hanger assembly 10 is depicted at FIG. 1. A pair of upper bent rod members 12a, 12b are connected at one end 12c to the vehicle underbody (not shown), and at the other end 12d to a respective resilient body of a pair of resilient bodies 14a, 14b. A lower bent rod member 16 is centrally connected to the resilient bodies 14a, 14b at a location separated from the connection of the upper bent rods 12a, 12b. The ends 14a, 14b of the lower bent rod member 16 are connected to the exhaust pipe 18.

While this form of exhaust hanger serves its purpose well, it suffers from degradation over time of the resilient body (typically rubber or rubber-like material), as well as the cost associated with the complexity and multiplicity of the components, as well as the assembly, of a typical exhaust hanger assembly.

Accordingly, what remains needed in the art is an improved exhaust hanger which does not have the deficiencies of known exhaust hanger assemblies.

SUMMARY OF THE INVENTION

The present invention is a pig tail spring exhaust hanger, preferably being formed of a single piece construction, which is free of the deficiencies of conventional exhaust hanger assemblies, wherein the pig tail spring exhaust hanger according to the present invention flexibly supports the vehicle exhaust system with respect to the vehicle underbody, while isolating both vibration and heat of the exhaust system from the vehicle underbody.

The pig tail spring exhaust hanger includes a metal pig tail coil having at one end an integral upper arm and at the opposite end an integral lower arm. The upper arm is mounted to the vehicle underbody, and the lower arm is connected to the exhaust pipe or other exhaust component, such as for example the muffler or catalytic converter. Preferably, the orientation of the upper and lower arms is substantially vertical and the orientation of the central axis of the pig tail coil is substantially horizontal. By providing a generally vertical orientation of the upper and lower arms and a generally horizontal orientation of the central axis of the pig tail coil, the pig tail spring exhaust hanger provides a pair of radial flexing (or working) moments of the pig tail coil, one moment at each of the upper and lower arms. As such, the suspended weight of the exhaust system acts radially with respect to the pig tail coil, rather than axially, as used in current conventional exhaust spring hangers. By supporting the exhaust system load radially, rather than the axially, the exhaust system can be more effectively constrained than is possible with conventional axially loaded exhaust spring hangers, while simultaneously eliminating traditional rubber isolator bodies, which can degrade over time.

Accordingly, it is an object of the present invention to provide a pig tail spring exhaust hanger which is free of the deficiencies of conventional exhaust hanger assemblies.

This and additional objects, features and advantages of the present invention will become clearer from the following specification of a preferred embodiment.

BRIEF DESCRIPTION OF THE DRAWINGS

FIG. 1 is a perspective view of an application of prior art exhaust hanger assembly with respect to an exhaust pipe.

FIG. 2 is a perspective view of an example of a pig tail spring exhaust hanger according to the present invention, shown at the preferred orientation.

FIG. 2A is a perspective view of an example of a pig tail spring exhaust hanger according to the present invention, shown with the central axis and the upper and lower arms at ninety degrees to the preferred orientation.

FIG. 2B is a side view of an example of a pig tail spring exhaust hanger according to the present invention, shown with the upper and lower arms at ninety degrees to the preferred orientation, but with the central axis at the preferred orientation.

DESCRIPTION OF THE PREFERRED EMBODIMENT

Figure 3:
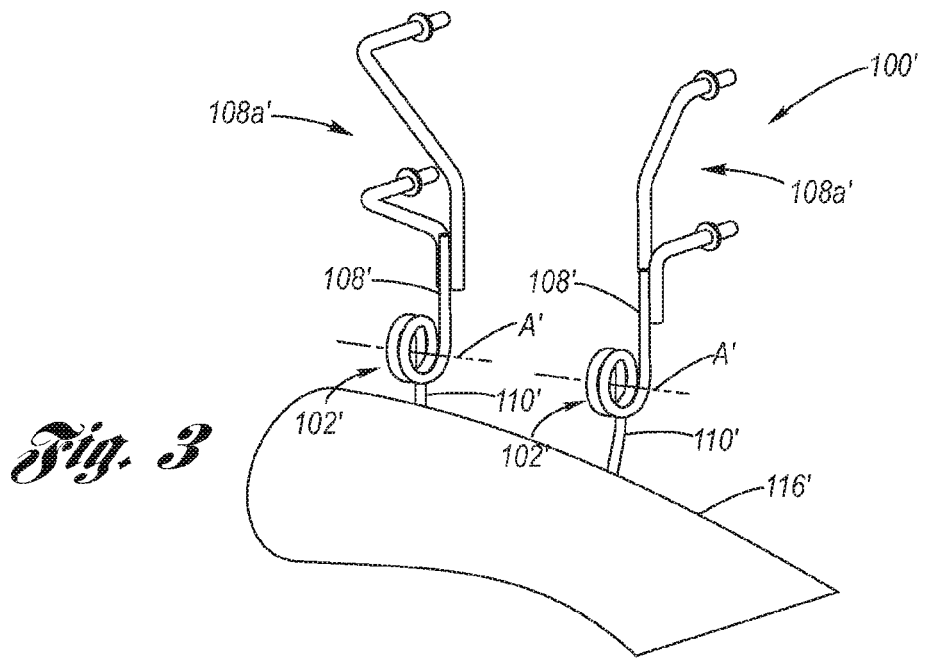
FIG. 3 is a perspective view of a pair of pig tail spring exhaust hangers according to the present invention, shown utilized in the application of FIG. 1.

Referring now to the Drawing, FIGS. 2 through 4C depict examples of a pig tail spring exhaust hanger 100, 100' according to the present invention.

Referring firstly to FIG. 2, a pig tail spring exhaust hanger 100 is depicted. The pig tail spring exhaust hanger 100 includes a pig tail coil 102 composed of at least one loop, wherein first, second and third loops 104a, 104b, 104c are shown merely by way of example. The pig tail coil 102 is formed of a metallic rod 106, as for example a spring steel rod. The rod 106 composing the pig tail coil 102 extends continuously at each end thereof, forming an upper arm 108 at a first end 102a of the pig tail coil and a lower arm 110 at the opposite, second end 102b of the pig tail coil, whereby, preferably, the pig tail exhaust hanger 100 is formed of a single piece construction.

The upper arm 108 extends tangentially off from the first end 102a of the pig tail coil 102, shown at the first loop 104a in FIG. 2, and radially with respect to a central axis A of the pig tail coil 102, wherein a first moment $M_1$ is established of the upper arm with respect to the central axis. The lower arm 110 extends tangentially off from the second end 102b of the pig tail coil 102, shown at the third loop 104c in FIG. 2, and radially with respect to the central axis A of the pig tail coil 102, wherein a second moment $M_2$ is established of the lower arm with respect to the central axis. In the case of a single loop pig tail coil, then the upper and lower arms would extend from that single loop.

Figures 4A, 4B, 4C:
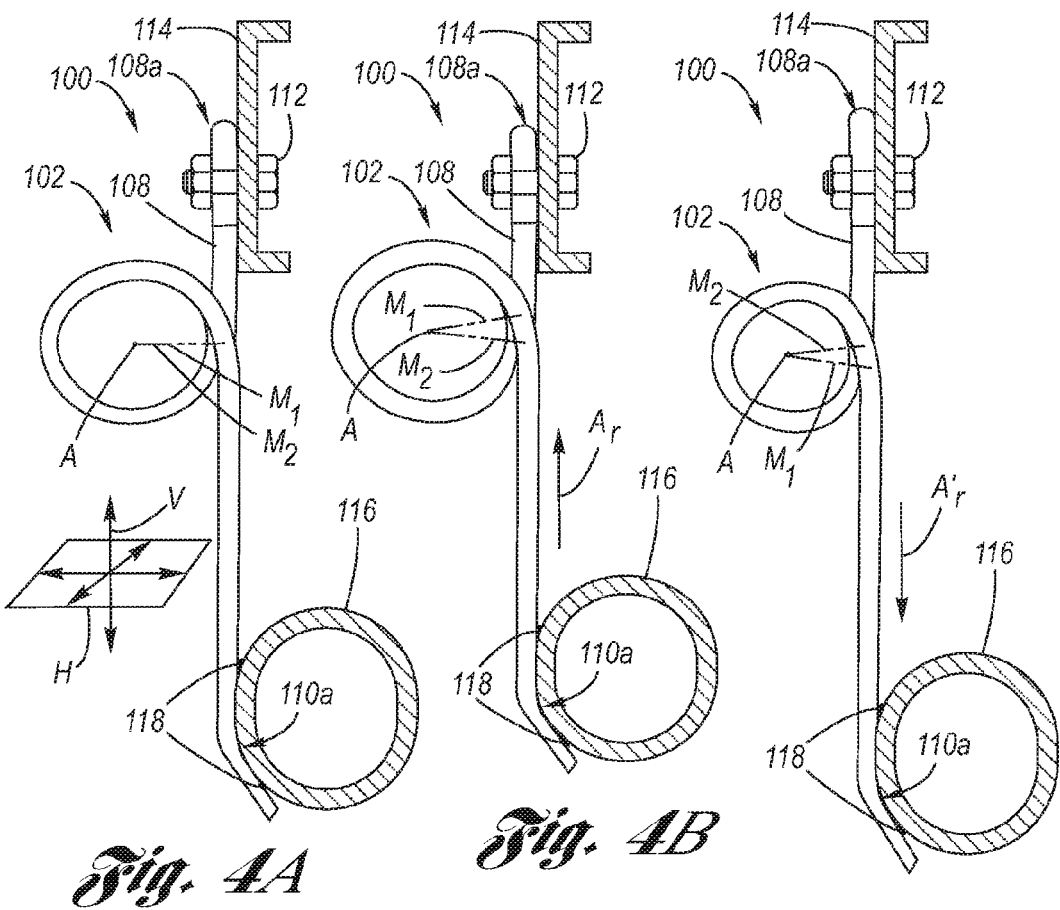
FIG. 4A is a side view of the pig tail spring hanger, seen along line 4A-4A of FIG. 2, and shown in operation with respect to a motor vehicle.
FIG. 4B is a side view of the pig tail spring hanger of FIG. 4A, wherein now vibration has caused the exhaust system to be displaced closer to the under body of the motor vehicle.
FIG. 4C is a side view of the pig tail spring hanger of FIG. 4A, wherein now vibration has caused the exhaust system to be displaced further from the under body of the motor vehicle.

As shown at FIG. 2, the upper and lower arms 108, 110 are oriented preferably vertically and the central axis A of the pig tail coil 102 is oriented preferably horizontally (see FIG. 4A, where by "vertical" or "vertically" is meant parallel to the vertical axis V and where by "horizontal" or "horizontally" is meant parallel to the horizontal plane H). However, while less preferred, the orientation of the central axis A may be at any orientation other than parallel to horizontal plane H, and the upper and lower arms may be oriented at any orientation other than parallel to the vertical axis V, as for example shown, merely by way of exemplification, at FIGS. 2A and 2B.

The upper arm 108 preferably extends generally straight, and has an upper end portion 108a which is predetermined for being adapted to connect to a component of the vehicle underbody. In this regard, as shown additionally at FIG. 4A, the upper end portion 108a may be in the form of a U-shape which is sized to be interfaced with a bolt 112, wherein the bolt is threadingly secured to an underbody component, such as for example the vehicle frame member 114.

The lower arm 110 preferably extends generally straight, and has a lower end portion 110a which is predetermined for being adapted to connect to a component of the exhaust system. In this regard, as shown additionally at FIG. 4A, the lower end portion 110a may be in the form of an obtusely angled flat which is configured to be interfaced with the exhaust pipe 116, such as for example being welded 118 thereto. However, the lower end portion 110a may be otherwise configured as for example to suitably clamp or otherwise connect with the exhaust system, such as at the exhaust pipe, the muffler or the catalytic converter.

By way of further exemplification, FIG. 3 depicts a pair of pig tail spring exhaust hangers 100' configured to substitute for the prior art exhaust hanger assembly of FIG. 1. In this regard, each pig tail coil 102' has a lower arm 110' and an upper arm 108', the upper and lower arms being oriented generally vertically and the central axis A' of the pig tail coil 102' is oriented generally horizontally. The upper end portion 108a' of each upper arm 108' is composed of first and second auxiliary upper arm which are welded to each upper arm 108', respectively, wherein the first and second auxiliary upper arms are bent to mimic the bends of the upper bent arm members of FIG. 1, and the lower arms 110' are also bent (not shown) to mimic the bends of the lower bent arm members of FIG. 1 and connected to the exhaust pipe 116'.

Structurally, the pig tail spring exhaust hanger 100' is far less complex than the multi-component prior art exhaust hanger assembly 10, and is advantageously free of a resilient (i.e., rubber) body. Operationally, the pig tail spring exhaust hanger 100' performs as well or better than the prior art exhaust hanger 10, and in time will not degrade.

Operation of the pig tail spring exhaust hanger 100 having the preferred orientation of FIG. 2 will now be detailed, with reference being directed, in particular, to FIGS. 4A through 4C.

In FIG. 4A, because of the preferred orientation of each of the upper and lower arms 108, 110 being generally parallel to the vertical axis V, the orientation of the central axis A being preferably generally parallel to the horizontal plane H, the first moment $M_1$ of the upper arm and the second moment $M_2$ of the lower arm are generally parallel to the horizontal axis H and the pig tail spring exhaust hanger 100 resiliently suspends the weight of the exhaust system radially with respect to the pig tail coil 102, whereby the exhaust system is effectively constrained in position with respect to spacing from the underbody of the vehicle, as indicated by frame member 114.

In FIGS. 4B and 4C the exhaust system is responding to a large amplitude vibration, as for example due to the vehicle traversing a pot hole. In FIG. 4B, the pig tail coil 102 resiliently twists larger (or looser) about the central axis A as the exhaust system, as represented by the exhaust pipe 116 moves closer (see arrow $A_r$) to the frame member 114. Note in FIG. 4B the repositioning of the moments $M_1$ and $M_2$. In FIG. 4C, the pig tail coil 102 resiliently twists smaller (or tighter) about the central axis A as the exhaust system, as represented by the exhaust pipe 116, moves closer (see arrow $A_r'$) to the frame member 114. Note in FIG. 4C the repositioning of the moments $M_1$ and $M_2$ are opposite to that of FIG. 4B. In either case of movement of the exhaust system relative to the under body, the pig tail coil 102 resiliently twists tighter or looser in response to vibration of the exhaust system so as to thereby isolate the vibration from the underbody.

The pig tail spring exhaust hanger according to the present invention has a number of advantages over conventional exhaust system suspension assemblies, including a simple construction, which can be as simple as a single piece construction; elimination of a rubber resilient body; and utilization of radial, as opposed to axial, resilient twisting which serves to provide simultaneously superior location constraint and vibration isolation of the exhaust system.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A pig tail spring exhaust hanger for hanging an exhaust system of a motor vehicle with respect to the underbody thereof, said pig tail spring exhaust hanger comprising:
   a pig tail coil having a first end, an opposite second end and a central axis, said pig tail coil comprising at least one loop;
   an upper arm connected to said first end; and
   a lower arm connected to said second end;
   wherein said upper arm is adapted for being connected to the underbody of the motor vehicle and said lower arm is adapted for being connected to the exhaust system of the motor vehicle such that said upper and lower arms are oriented substantially vertically and said central axis is oriented substantially horizontally;

wherein said upper arm extends tangentially off from said first end of said pig tail coil and radially with respect to said central axis, wherein a first moment ($M_1$) is established of said upper arm with respect to said central axis;

wherein said lower arm extends tangentially off from said second end of said pig tail coil and radially with respect to said central axis, wherein a second moment ($M_2$) is established of said lower arm with respect to said central axis; and wherein said first and second moments each act to resiliently twist said pig tail coil so as to springably hang the exhaust system of the motor vehicle from the underbody of the motor vehicle radially with respect to said pig tail coil.

2. The pig tail spring exhaust hanger of claim 1, wherein said pig tail coil comprises a plurality of loops.

3. The pig tail spring exhaust hanger of claim 2, wherein said pig tail coil, said upper arm and said lower arm are collectively formed of a single piece construction.

4. A pig tail spring exhaust hanger hanging an exhaust system of a motor vehicle with respect to the underbody thereof, comprising:
    an underbody of the motor vehicle;
    an exhaust system of the motor vehicle; and
    at least one pig tail spring exhaust hanger, comprising:
        a pig tail coil having a first end, an opposite second end and a central axis, said pig tail coil comprising at least one loop;
        an upper arm connected to said first end; and
        a lower arm connected to said second end;
        wherein said upper arm is connected to said underbody and said lower arm is connected to said exhaust system such that said upper and lower arms are oriented substantially vertically and said central axis is oriented substantially horizontally;
    wherein said upper arm extends tangentially off from said first end of said pig tail coil and radially with respect to said central axis, wherein a first moment ($M_1$) is established of said upper arm with respect to said central axis;
    wherein said lower arm extends tangentially off from said second end of said pig tail coil and radially with respect to said central axis, wherein a second moment ($M_2$) is established of said lower arm with respect to said central axis; and
    wherein said first and second moments each act to resiliently twist said pig tail coil so as to springably hang the exhaust system of the motor vehicle from the underbody of the motor vehicle radially with respect to said pig tail coil.

5. The pig tail spring exhaust hanger hanging an exhaust system of a motor vehicle with respect to the underbody thereof of claim 4, wherein said pig tail coil comprises a plurality of loops.

6. The pig tail spring exhaust hanger hanging an exhaust system of a motor vehicle with respect to the underbody thereof of claim 4, wherein said pig tail coil, said upper arm and said lower arm are collectively formed of a single piece construction.

7. A pig tail spring exhaust hanger hanging an exhaust system of a motor vehicle with respect to the underbody thereof, comprising:
    an underbody of the motor vehicle;
    an exhaust system of the motor vehicle; and
    at least one pig tail spring exhaust hanger, comprising:
        a pig tail coil having a first end, an opposite second end and a central axis, said pig tail coil comprising at least one loop;
        an upper arm connected to said first end; and
        a lower arm connected to said second end;
        wherein said upper arm is connected to said underbody and said lower arm is connected to said exhaust system;
    wherein said upper arm extends tangentially off from said first end of said pig tail coil and radially with respect to said central axis, wherein a first moment ($M_1$) is established of said upper arm with respect to said central axis;
    wherein said lower arm extends tangentially off from said second end of said pig tail coil and radially with respect to said central axis, wherein a second moment ($M_2$) is established of said lower arm with respect to said central axis; and
    wherein said first and second moments each act to resiliently twist said pig tail coil so as to springably hang the exhaust system of the motor vehicle from the underbody of the motor vehicle radially with respect to said pig tail coil.

8. The pig tail spring exhaust hanger hanging an exhaust system of a motor vehicle with respect to the underbody thereof of claim 7, wherein said pig tail coil comprises a plurality of loops.

9. The pig tail spring exhaust hanger hanging an exhaust system of a motor vehicle with respect to the underbody thereof of claim 7, wherein said pig tail coil, said upper arm and said lower arm are collectively formed of a single piece construction.

* * * * *